(12) United States Patent
Morgenthal

(10) Patent No.: US 7,548,834 B2
(45) Date of Patent: Jun. 16, 2009

(54) METHOD FOR PROCESSING SENSOR DATA

(75) Inventor: Robert Morgenthal, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 11/662,912

(22) PCT Filed: Jul. 18, 2005

(86) PCT No.: PCT/EP2005/053442

§ 371 (c)(1),
(2), (4) Date: Nov. 14, 2007

(87) PCT Pub. No.: WO2006/029924

PCT Pub. Date: Mar. 23, 2006

(65) Prior Publication Data
US 2008/0195683 A1 Aug. 14, 2008

(30) Foreign Application Priority Data
Sep. 15, 2004 (DE) ......... 10 2004 044 466

(51) Int. Cl.
H03F 1/26 (2006.01)
(52) U.S. Cl. ......... 702/189; 702/194; 702/199; 708/209; 708/290; 708/442; 708/445
(58) Field of Classification Search ......... 702/189, 702/194, 199; 708/209, 290, 442, 445
See application file for complete search history.

(56) References Cited

U.S. PATENT DOCUMENTS

2003/0171853 A1   9/2003   Otterbach et al.
2008/0103733 A1*  5/2008   Thiel et al. ......... 702/189

FOREIGN PATENT DOCUMENTS

DE   197 34 248   2/1999

* cited by examiner

Primary Examiner—Tung S Lau
Assistant Examiner—Sujoy K Kundu
(74) Attorney, Agent, or Firm—Kenyon & Kenyon LLP

(57) ABSTRACT

A method for processing sensor data which are transmitted by at least one asynchronous sensor at a transfer rate, the sensor data being read at a predefined sampling rate, a mean value being computed from a predefined number of read sensor data, wherein the sampling ratio between the sampling rate and transfer rate is estimated for averaging, the number of transmitted data values and the number of sampling pulses within a predefined time span being ascertained and correlated to each other for estimating the sampling ratio.

7 Claims, 5 Drawing Sheets

↑ read sampling pulse    ↑ sensor sampling value    ○ computed mean value of the sensor sampling values

METHOD FOR PROCESSING SENSOR DATA

BACKGROUND INFORMATION

In systems employing methods that use data from asynchronous sensors, the sensor data values are of different age as a matter of the underlying principle. When considering simulations over sampling variations, the sensor data bell out considerably. Therefore the methods, for example, triggering methods for personal protection means, which use the processed sensor data values, must have an appropriately robust design with respect to these sensor data variations, which makes customer requirements considerably more difficult to meet and increases system costs.

To compensate for these effects, the asynchronous sensor data values can be quasi-synchronized using interpolation to an algorithm grid. However, the factors for interpolation are a function of the transfer rate of the sensors and of the sampling rate. Like all components, oscillators and thus the transfer rates and sampling rates generated are subject to tolerances, which distort the interpolation result and thus the processed signals.

SUMMARY OF THE INVENTION

The method according to the present invention for processing sensor data has the advantage over the related art that, by estimating the sampling ratio between the sampling rate and the transfer rate, averaging becomes independent of tolerances of the sampling rate and/or the transfer rate. This allows the sampling tolerances, which are unavoidable in components, to be compensated for and the measurement results are no longer distorted. In addition, the scatter of the sensor data which results from signal variations in the asynchronous sensor sampling, as well as from the tolerances in the transfer rate and the sampling rate, is advantageously reduced. The robustness of a method that uses the processed data as input values, for example, for triggering personal protection means such as airbags, safety belt tensioners, etc., may thereby be improved. The overall system made up of asynchronous sensors and a control unit using analysis methods is thus improved with respect to signal variations, which occur in reality as a matter of principle. Customer requirements are more easily met due to the reduced signal scatter, and the system costs are reduced. To estimate the sampling ratio, the number of transmitted data values and the number of sampling pulses within a predefinable time period are ascertained and correlated.

It is particularly advantageous that, in the method according to the present invention, the number of sensor data averaged within a sampling period is n or (n+1), the mean values of the read sensor data being computed using a fixed synchronized phase shift with respect to the sampling rate, the phase shift being determined in averaging the (n+1) sensor data, n being natural number greater than or equal to two.

It is furthermore advantageous that the mean values computed from (n+1) sensor data are used as starting values for an interpolation, preferably a linear interpolation, of the subsequent mean values computed from n sensor data, the interpolation being independent of the tolerances in the transfer rate and the sampling rate.

The number of consecutive averaging operations, each forming the mean value of n read sensor data, is advantageously determined for the interpolation, the number being reset to zero when the mean value is formed from (n+1) sensor data.

The mean value for n sensor data occurring within a sampling period may be interpolated, for example, as a function of the number of averaging operations by the linear interpolation equation (1):

$$S_{M(ZS)} = ((Z\ddot{U}/ZA) - \text{Div}(Z\ddot{U}/ZA)) * ZS * (S_{Mnew} - S_{Mold}) + S_{Mold} \quad (1)$$

where $S_M$: mean value
ZS: number of averaging operations using n sensor data values
ZÜ: number of transmission data
ZA: number of sampling pulses
Div: integer division without remainder The processed sensor data may be used, for example, as input values of a triggering method for personal protection means; the at least one asynchronous sensor may be designed, for example, as part of an upfront sensor system and/or a surroundings sensor system and/or a lateral impact sensor system and/or a contact sensor system for pedestrian protection.

DETAILED DESCRIPTION

Figure 2:
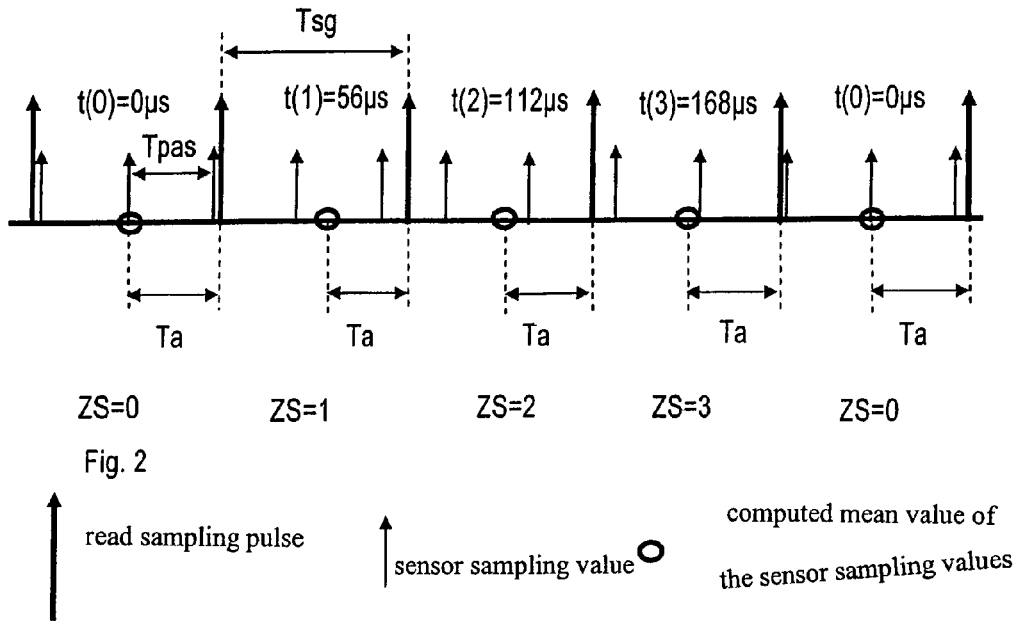
FIG. 2 shows a time sequence diagram for depicting the signals in a processing method.

According to the current related art, external peripheral sensors 10 are connected to a control unit 100 via a supply lead. As is apparent from FIG. 2, in a conventional processing method, the at least one asynchronous external sensor 10 transmits the sensor data to control unit 100 at fixed time intervals Tpas of 228 µs, for example. The data are buffered and sampled at a sampling rate Tsg of 512 µs, for example, the mean values of the read sensor data being computed with a fixed synchronized phase shift Ta with respect to sampling rate Tsg for further processing. The mean value for n sensor data occurring within a sampling period may be ascertained as a function of their number using equation (2), for example:

$$S_{M(ZS)} = (t_{(ZS)}/Tpas) * (S_{Mnew} - S_{Mold}) + S_{Mold} \quad (2)$$

where $S_M$: mean value
ZS: number of averaging operations using n sensor data values
Tpas: transfer rate For runtime-optimum implementation in a control unit, the factor ($t_{(ZS)}$/Tpas), which is a function of the number ZS, may be computed in advance and stored, for example. The factors computed in advance may be stored, for example, in an array using an index corresponding to the respective number ZS. Time span $t_{(ZS)}$ represents in general the time interval between the interpolated value and the immediately preceding transmitted sensor data value and may be computed using equation (3), for example:

$$t_{(ZS)}=(Tgs-Tpas*\text{Div}(Tgs/Tpas))*ZS \qquad (3)$$

where Tgs: sampling rate
Div: integer division without remainder

The general equation (4) for linear interpolation then results from equations (2) and (3):

$$S_{M(ZS)}=((Tgs/Tpas)-\text{Div}(Tgs/Tpas))*ZS*(S_{Mnew}-S_{Mold})+S_{Mold} \qquad (4)$$

However, the factors for interpolation are a function of the transfer rate of the sensors and of the sampling rate of the control unit, which may have tolerances distorting the interpolation result and thus the input data for a subsequent triggering method.

Therefore, according to the present invention, the sampling ratio between the sampling rate Tsg and the transfer rate Tpas is estimated for computing the mean values, the number ZÜ of transmitted data values and the number ZA of sampling pulses within a predefinable time period being ascertained and correlated for estimating the sampling ratio. Computing the mean values becomes independent of the tolerances in the sampling rate and/or the transfer rate due to the estimation of the sampling ratio.

Figure 1:
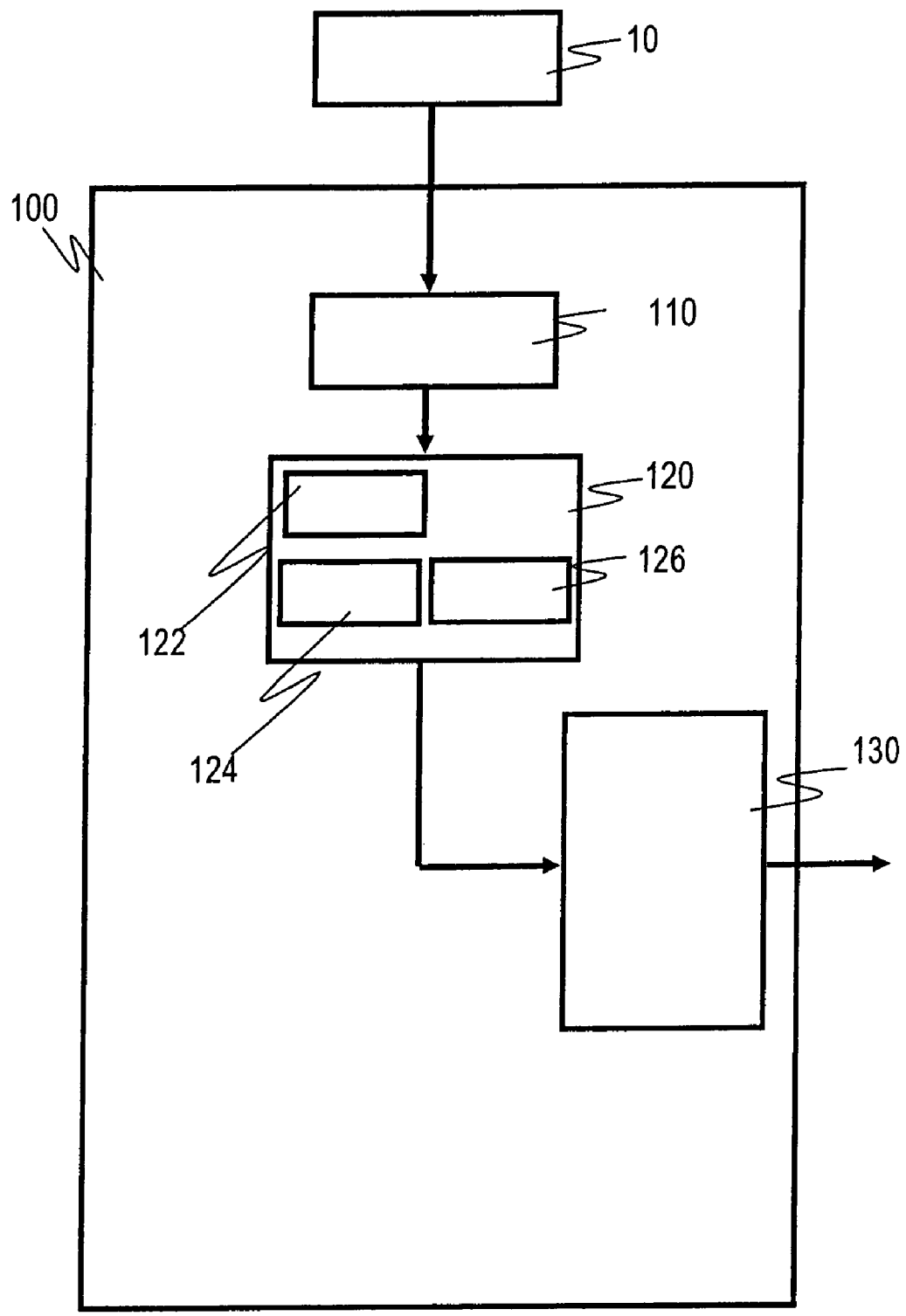
FIG. 1 shows a block diagram of a device for carrying out the method according to the present invention.
Figure 3:
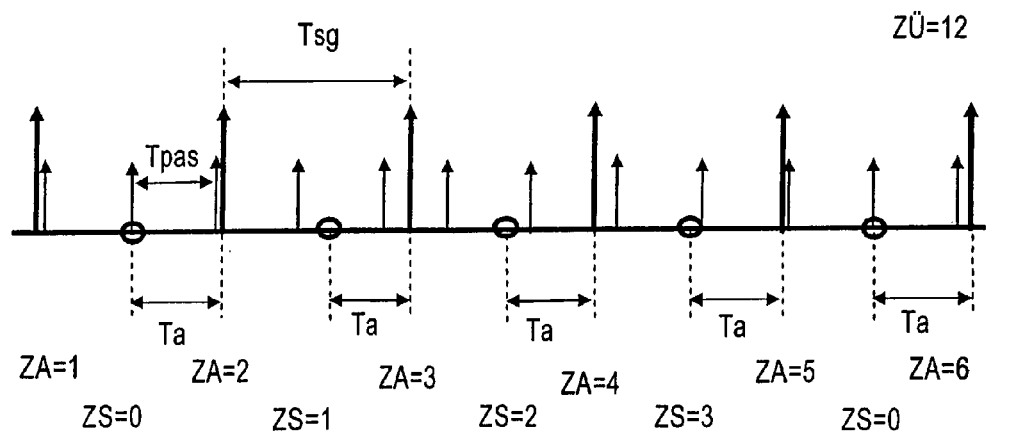
FIG. 3 shows a time sequence diagram for depicting the signals in a processing method according to the present invention.

FIG. 1 shows a block diagram of a device for carrying out the method according to the present invention for processing sensor data, and FIG. 3 shows a time sequence diagram depicting the signals for the processing method according to the present invention. The method according to the present invention is described below with reference to FIGS. 1 and 3.

As is apparent from FIG. 1, the device includes an external sensor system 10, which includes at least one asynchronous sensor and is connected to a control unit 100 via a supply lead. Sensor system 10 transmits sensor data to control unit 100 at fixed time intervals Tpas of 228 μs, for example, with a tolerance of ±12 μs. The transmitted sensor data are buffered in a buffer memory 110. Control unit 100 includes an analysis and control unit 120, which is designed as a microprocessor, for example, and cyclically reads the data at a sampling rate Tsg of ±512 μs with a tolerance of ±6 μs from buffer memory 110, processes the data and generates, for example, input values for a triggering unit 130 which activates personal protection means such as an airbag, seatbelt tensioner, etc., which are not illustrated. Buffer memory 110 is emptied by the reading of the sensor data. Read cycle Tsg=512 μs is selected for a transfer rate Tpas of 228 μs in such a way that 2 or 3 sensor data values are read for averaging within a sampling period. Analysis and control unit 120 includes a first counter 122, which counts the averaging operations in which the mean value is formed from two sensor data values transmitted within a sampling period Tsg, a second counter 124, which counts number ZÜ of sensor data transmitted within a predefinable time period, and a third counter 126, which counts number ZA of sampling pulses within the predefined time period. If three sensor data values are transmitted within a sampling period Tsg, the corresponding averaging operation resets counter 122 to zero. Counts ZS, ZÜ, and ZA of counters 122, 124, and 126, respectively, are used for an interpolation, preferably a linear interpolation, of the mean values.

FIG. 3 shows as an example that, due to the transfer rate Tpas to sampling rate Tsg ratio, two or three sensor data values are transmitted within a sampling period. During first sampling period Tsg, for example, three sensor data signals are sampled, and count ZS of counter 122 is set to zero. If three sensor data values are read within a sampling period Tsg, the method according to the present invention assumes that they are situated in the middle between the sampling pulses. The mean value of the sensor signals is computed by a subsequent interpolation using a constant phase shift Ta=256 μs with respect to the sampling pulses, i.e., one-half of the period duration of sampling signal Tsg.

The interpolation for the mean values of the subsequent averaging operations, which take into account only two transmitted sensor data values, is computed, for example, by a linear interpolation according to equation (1):

$$S_{M(ZS)}=((ZÜ/ZA)-\text{Div}(ZÜ/ZA))*ZS*(S_{Mnew}-S_{Mold})+S_{Mold} \qquad (1)$$

where $S_M$: mean value
ZS: number of averaging operations using n sensor data values
ZÜ: number of transmission data
ZA: number of sampling pulses
Div: integer division without remainder As is further apparent from FIG. 3, count ZS of first counter 122 is incremented by each averaging operation using two sensor data values up to a count of three. Counter 122 is then reset to zero again by the averaging operation using three sensor values. Count ZÜ of second counter 124 is incremented by each data value transmitted, and count ZA of third counter 126 is incremented by each sampling pulse. The time period in which the second and third counters are operated is a function of the desired precision. Instead of linear interpolation, interpolation of a higher order may also be used for determining the mean value.

Figure 4:
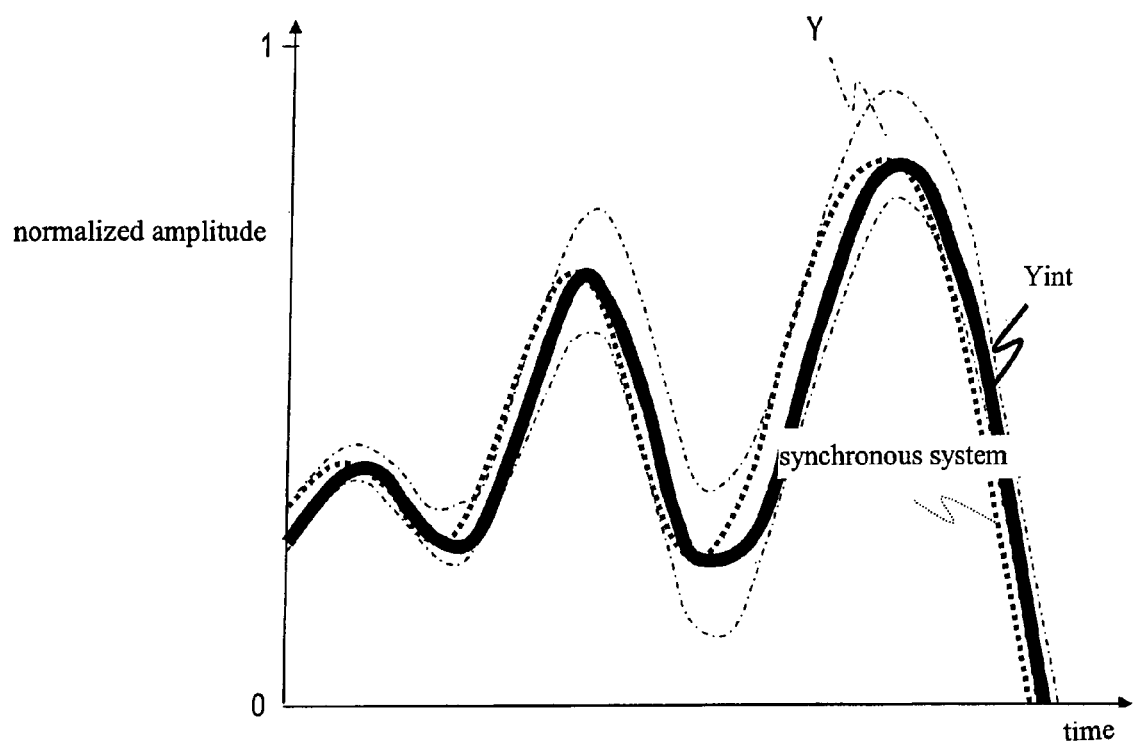
FIG. 4 shows a schematic depiction of the signal scatter for different processing methods, the transfer rates and sampling rates having no tolerances.

FIGS. 4 through 8 show different signal variances having transfer rates and sampling rates with different deviations, a crash simulation over approximately 400 sampling periods, which corresponds to approximately 900 transmission periods, from different processing methods having normalized signal amplitudes being depicted in an exemplary manner. FIG. 4 schematically shows the signal scatter for different processing methods, the transfer rate being Tpas=228 μs, and the sampling rate Tsg=512 μs corresponding to the desired values without tolerances. The dotted line shows, for comparison, the signal pattern of a synchronous system in which no variance occurs as a matter of principle. The bolded signal pattern Yint shows the signal variance of the processing method using a fixed synchronized phase shift Ta with respect to sampling rate Tsg of the sensor data values, which are averaged according to interpolation equation (4), and the dash-dotted frame shows range Y of the signal variance of a conventional method having sensor data values of different ages.

Figure 5:
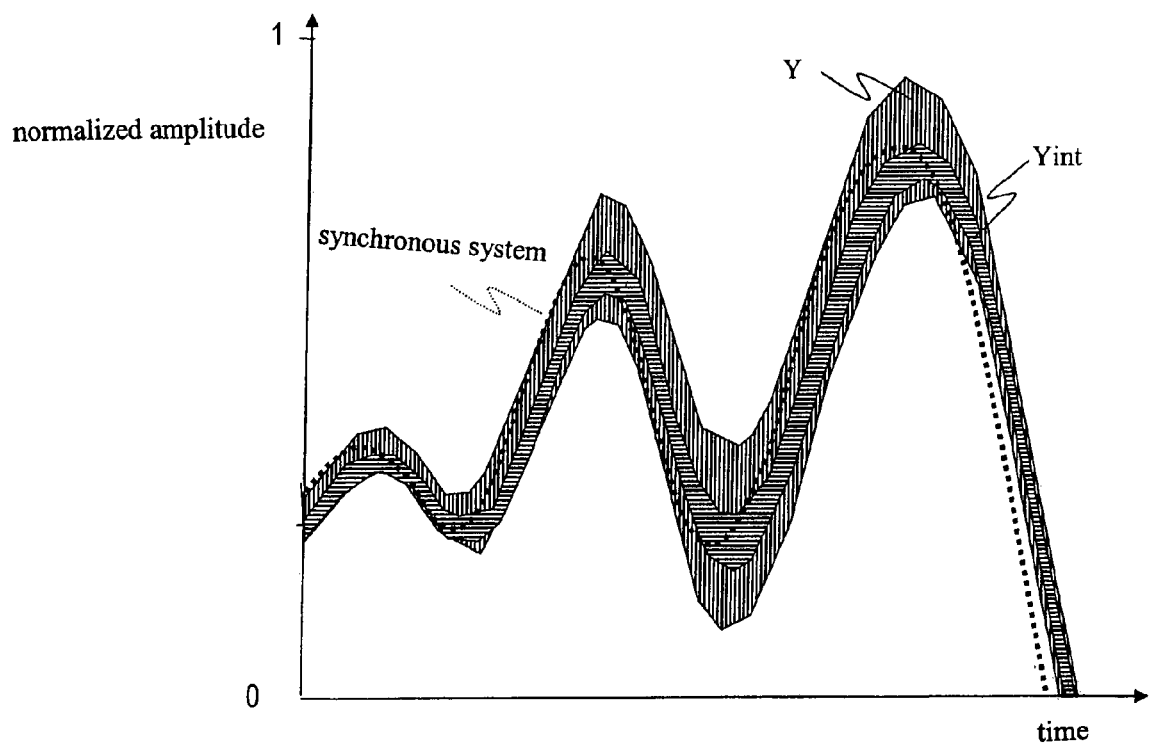
FIG. 5 shows a schematic depiction of the signal scatter for different processing methods, a transfer rate having a maximum negative deviation and a sampling rate having a maximum positive deviation.

FIG. 5 schematically shows the signal scatter for the method depicted in FIG. 4, the transfer rate being Tpas=228 μs−12 μs=216 μs, and the sampling rate Tsg=512 μs+6 μs=518 μs. As is apparent from FIG. 5, the horizontally shaded signal variance Yint of the processing method using the fixed synchronized phase shift Ta has worsened, since the interpolation equation (4) still performs the computation using the desired values Tpas=228 μs and Tgs=513 μs, and the tolerances that occur are not taken into account.

Figure 6:
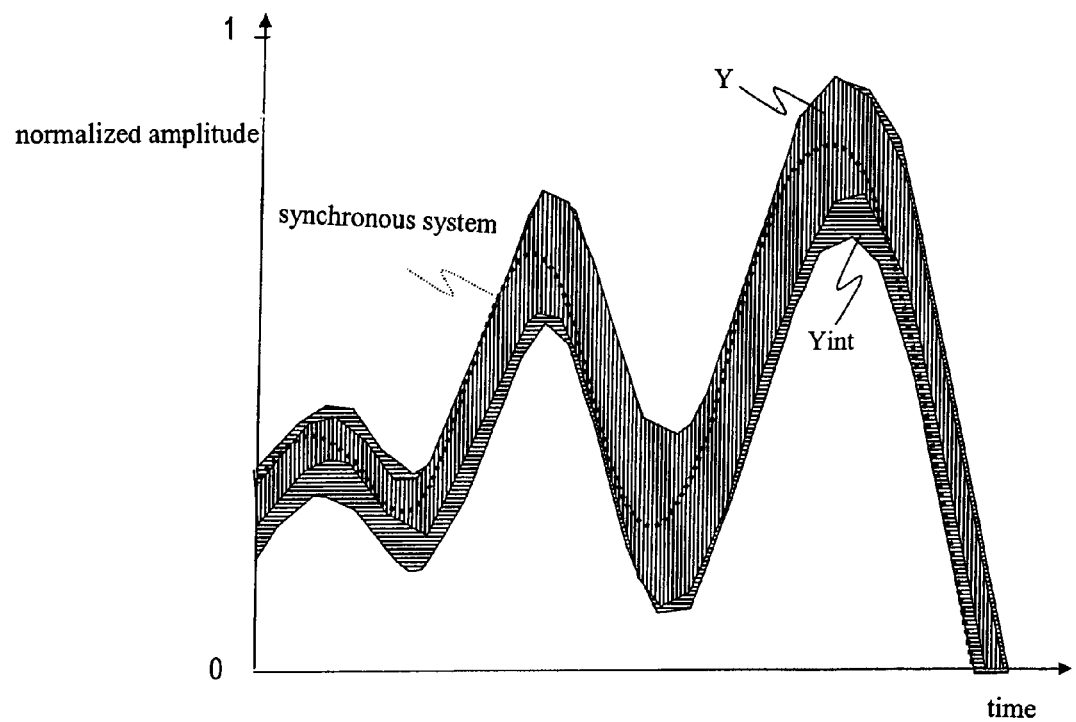
FIG. 6 shows a schematic depiction of the signal scatter for different processing methods, a transfer rate having a maximum positive deviation and a sampling rate having a maximum negative deviation.

FIG. 6 schematically shows the signal scatter for the methods depicted in FIG. 4, the transfer rate being Tpas=228 μs+12 μs=240 μs, and the sampling rate Tsg=512 μs−6 μs=506 μs. As is apparent from FIG. 6, the horizontally shaded signal variance Yint of the processing method using the fixed synchronized phase shift Ta has worsened considerably, since the interpolation equation (4) still performs the computation using the desired values Tpas=228 μs and Tgs=513 μs, and the tolerances that occur are not taken into account.

Figure 7:
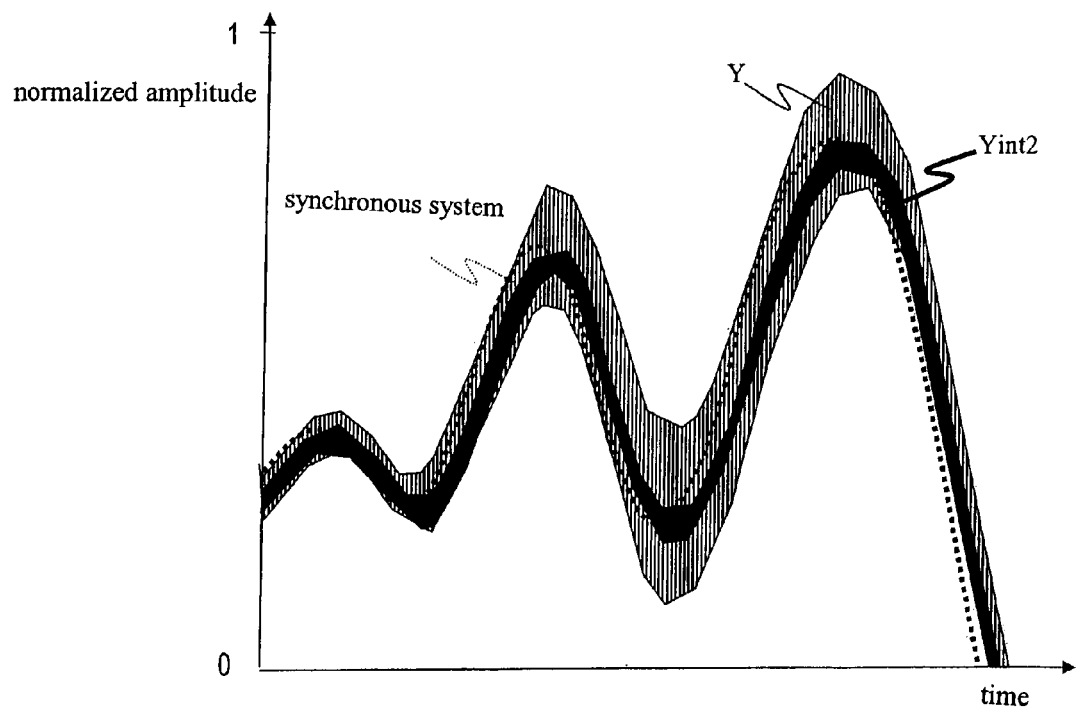
FIG. 7 shows a schematic depiction of the signal scatter for the processing method according to the present invention, a transfer rate having a maximum negative deviation and a sampling rate having a maximum positive deviation.

FIG. 7 shows signal variance Yint2 of the processing method according to the present invention in black for comparison, the transfer rate being Tpas=228 μs−12 μs=216 μs and the sampling rate Tsg=512 μs+6 μs=518 μs. As is apparent from FIG. 7, a slight reduction in the signal variance Yint2 is achieved via the method according to the present invention compared to signal variance Yint of FIG. 5.

Figure 8:
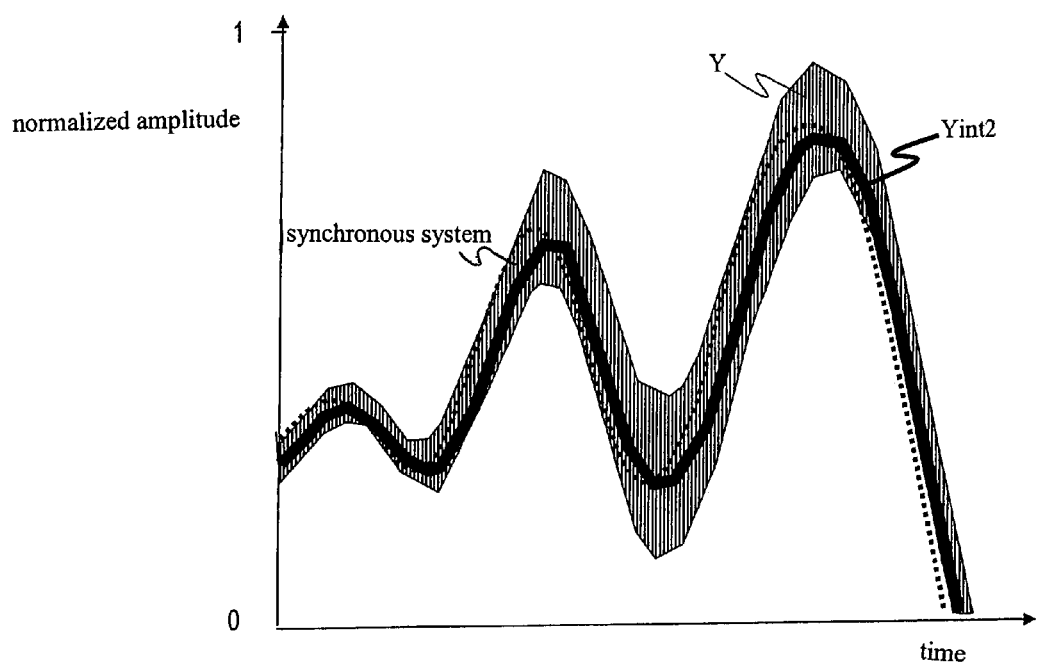
FIG. 8 shows a schematic depiction of the signal scatter for the processing method according to the present invention, a transfer rate having a maximum positive deviation and a sampling rate having a maximum negative deviation.

FIG. 8 shows signal variance Yint2 of the processing method according to the present invention in black for comparison, the transfer rate being Tpas=228 μs+12 μs=240 μs and the sampling rate Tsg=512 μs−6 μs=506 μs. As is apparent from FIG. 8, a significant reduction in the signal variance Yint2 is achieved via the method according to the present invention compared to signal variance Yint of FIG. 6. It is apparent from FIGS. 7 and 8 that the tolerances in the transfer rate and/or the sampling rate affect the result to a considerably lesser degree than in the conventional method.

The method according to the present invention is usable in principle in any system processing sensor data of asynchronous sensors to generate input values, for example, for triggering personal protection means. The sensor system having asynchronous sensors may be designed, for example, as part of an upfront sensor system and/or a surroundings sensor system and/or a lateral impact sensor system and/or a contact sensor system for pedestrian protection.

What is claimed is:

1. A method for processing sensor data comprising:
   transmitting the sensor data by at least one asynchronous sensor at a transfer rate;
   reading the sensor data at a predefined sampling rate;
   computing mean values from a predefined number of read sensor data;
   estimating a sampling ratio of the sampling rate to the transfer rate for computing the mean values; and
   ascertaining and correlating a number of transmitted data values and a number of sampling pulses within a predefinable time period for estimating the sampling ratio.

2. The method according to claim 1, wherein the number of sensor data values averaged within a sampling period is n or (n+1), the mean values of the read sensor data being computed using a fixed synchronized phase shift with respect to the sampling rate, the phase shift being determined in averaging (n+1) sensor data, n being a natural number greater than or equal to two.

3. The method according to claim 2, wherein mean values computed from (n+1) sensor data are used as starting values for an interpolation of subsequent mean values computed from n sensor data.

4. The method according to claim 3, wherein a number of consecutive averaging operations, each forming the mean value of n read sensor data, is determined for the interpolation, the number being reset to zero when the mean value is formed from (n+1) sensor data.

5. The method according to claim 3, wherein the mean value for n sensor data occurring within a sampling period is interpolated as a function of the number of consecutive averaging operations, using the linear interpolation equation $$S_{M(ZS)}=((Z\ddot{U}/ZA)-\mathrm{Div}(Z\ddot{U}/ZA))*ZS*(S_{Mnew}-S_{Mold})+S_{Mold}.$$

6. The method according to claim 1, wherein the processed sensor data are used as input values of a triggering operation for a personal protection device.

7. The method according to claim 1, wherein the at least one asynchronous sensor is part of at least one of an upfront sensor system, a surroundings sensor system, a lateral impact sensor system and a contact sensor system for pedestrian protection.

* * * * *